Sept. 6, 1932. C. KRAUCH ET AL 1,876,009
CONVERSION OF SOLID FUELS AND PRODUCTS DERIVED THEREFROM
OR OTHER CARBONACEOUS MATERIALS INTO VALUABLE PRODUCTS
Original Filed Feb. 6, 1926
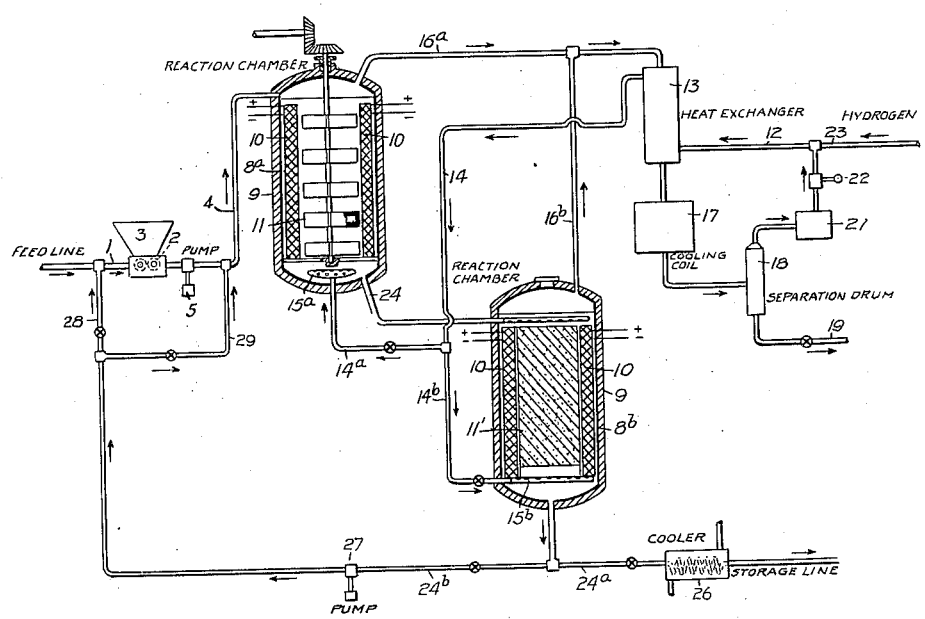
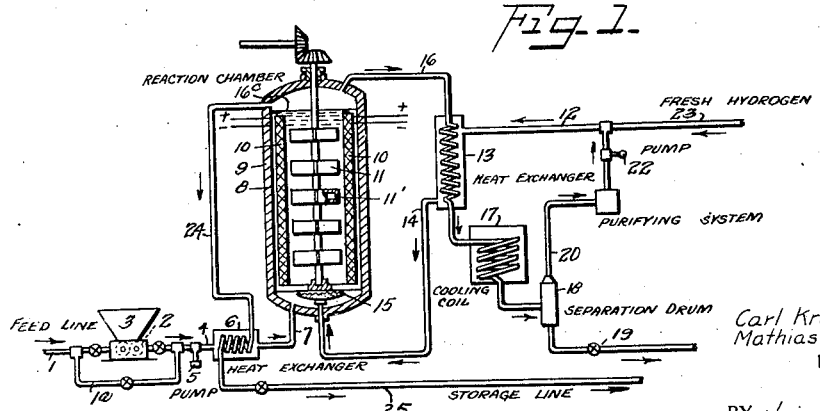
Carl Krauch
Mathias Pier
INVENTORS
BY *Hauff & Barland*
ATTORNEYS Patented Sept. 6, 1932

1,876,009

UNITED STATES PATENT OFFICE

CARL KRAUCH AND MATHIAS PIER, OF LUDWIGSHAFEN-ON-RHINE, GERMANY, ASSIGNORS, BY MESNE ASSIGNMENTS, TO STANDARD-I. G. COMPANY, OF LINDEN, NEW JERSEY, A CORPORATION OF DELAWARE

CONVERSION OF SOLID FUELS AND PRODUCTS DERIVED THEREFROM OR OTHER CARBONACEOUS MATERIALS INTO VALUABLE PRODUCTS

Original application filed February 6, 1926, Serial No. 86,646, and in Germany September 10, 1925. Divided and this application filed February 29, 1928. Serial No. 258,144.

One of the most important and widely discussed problems in the industrial world has for a long time been how to produce good gasoline or other valuable liquid fuels from solid fuel including coal in all its varieties and wood, and products of distillation, or mineral oils, especially heavy oils.

One attempt at the solution of this problem has been by liquefaction of coals by means of hydrogen or by destructive hydrogenation of tars or oils under high pressure at high temperature, but this has not reached application industrially because of an unsatisfactory speed and rate of the conversion.

By the process described in the application for patent Ser. No. 86,646, filed February 6, 1926, of which this application is a division, we claim to have successfully solved this problem for the first time and to be able to produce good pure liquid fuels, including also benzines from solid fuels and to convert also tars obtained from solid fuels and also heavy mineral oils or residues into more valuable liquid products, including benzines, by a process economical in material, time, labor and wear of apparatus.

In arriving at the herein described process we have made several discoveries or inventions, to certain of which this application relates.

We conceived the idea of applying a catalyst to said solid fuel or other materials, in connection with said hydrogenizing high pressure and high temperature process, but found that an improvement of the process could not be obtained at all or at least not in a continued operation.

Thereafter we discovered that the cause of this drawback was the sulfur present in the treated material, and by experimenting discovered certain catalysts which would work satisfactorily under the existing conditions notwithstanding the presence of the sulfur or sulfur compounds. Such catalysts prove valuable not only under high pressure but even under ordinary pressure though high pressure is more suitable. The hydrogenizing gas is most advantageously employed in the form of a stream.

The catalysts most suitable to be added for effecting the said conversion must be of a nature substantially immune to sulfur poisoning in this process and can be of varied character.

We cite as examples of catalysts of the kind mentioned such comprising compounds of silver or copper alone or together with difficultly reducible metal oxides or carbonates forming difficultly reducible metal oxides, such as oxides or carbonates of magnesium, lithium of zinc, manganese, or vanadium. The catalysts may also contain other additional catalytic elements, for example iron or other metals of the iron group. In the case of mixed catalysts the constituents thereof are present in the catalyst in the state of physical mixtures, which may either be prepared mechanically or by precipitation from a common solution of the constituents. Iron or metals of the iron group should not be contained in the catalyst in amounts of more than 10 per cent by weight, whereas difficultly reducible oxides may be contained in amounts of up to 80 or 90 per cent by weight.

The said catalysts may be added in any suitable manner. They may be added to the solid or liquid material, or in the case of liquids they may be placed into the reaction vessel and the liquids brought into contact with them in a vaporized or otherwise finely divided state. Other bodies, for example, lumps of brick, quartz, asbestos, coke, active carbon, silica gel, metals, especially heavy metals, or metal oxids, or carbids, or mixtures of such bodies, may also be present in the reaction chamber. The said bodies may have the effect of suppressing the formation of carbon deposits or of facilitating the distribution of the hydrogenating gas. They may also act as carriers for distributing the catalyst.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained from them, whether by ordinary destructive distillation or by low temperature carbonization, or brown coal bitumen, or tars or oils obtained by pressure hydrogenation of solid or liquid fuels, or components or conversion products of all above mentioned materials, such as cracked products, cumarone or any other resins or residues of their distillation, pitch, asphalt and so on, or mixtures of several such products with each other, also of solids with liquids or of one or more of such products with other suitable organic liquids. Solid carbonaceous initial materials are preferably treated dispersed in a liquid oil. By the term "extraction products" is meant products obtained by the treatment by extraction of carbonaceous materials with a solvent, such as benzene.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

The gases serving for the reaction may consist of hydrogen alone or of mixtures containing hydrogen, for example a mixture of hydrogen with nitrogen, or water gas, or hydrogen mixed with carbon dioxid, hydrogen sulfid, water vapor or methane or other hydrocarbons. Or the hydrogen may be generated in the reaction chamber by the interaction of water and coal, carbon monoxid, hydrocarbons and the like.

In order to avoid an attack of the apparatus by sulfur or other influences which is a serious difficulty in the practical performance of the process, we have found it excellently suitable to compose or line the apparatus where it may come into contact with hot gaseous, liquid or solid carbonaceous material, of aluminium or its alloys which metals may be used until near their melting point. Also chromium and alloys therewith prove resistant to the attack in the course of the operation in so far as the coatings or linings of these metals are non-porous and impermeable to gas. Especially chromium itself and alloys containing more than 10 per cent of chromium and not more than 0.2 per cent, preferably less than 0.1 per cent of carbon, are very suitable. At the same time a content of nickel amounting to 40 per cent or more constitutes a very useful material which is not attacked even if in use for a very long time.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example temperature and pressure employed or duration of the treatment, the products are poor or rich in products of low boiling point. The temperature employed is such that the initial materials will undergo conversion by the action of hydrogen. Generally the temperature ranges between 300 and 700° C., and when working under pressure, it should amount to 20, 50 or more atmospheres.

Compounds obtained by the aforedescribed hydrogenation treatment of solid fuels, tars, mineral oils and other materials referred to, which compounds may be comprised by the term destructively hydrogenized fuels generally have a very low content of sulfur or even completely free therefrom and are excellently suitable for use as fuel for internal combustion engines.

In the accompanying drawing an apparatus for carrying out the one-stage process and an apparatus for carrying out the two-stage process, both being continuous, are illustrated diagrammatically, partly in vertical section. Our invention is not limited to the apparatus illustrated therein, however, but may be varied at will in accordance with the conditions of working.

Referring to the drawing in Figure 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, above 20 to 100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and, if desired, suitable catalytic material 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum for example at the point 16c and gas and vaporous products may be continuously withdrawn by vapour line 16 which is in communication with exchanger 13 and a cooling coil or condenser 17. The condensate and gas is discharged into a separation drum 18 from which the distillate is removed by line 19 to storage not shown. The gas may be taken off by a pipe 20 to a purifying system indicated at 21, and which may comprise a scrubbing system preferably carried out at high pressure using, for example, soda to remove hydrogen sulfide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with a heat exchanger 6 and which is withdrawn to storage, not shown by a suitable line 25.

Referring now to the drawing in Figure 2 a suitable system is shown for converting solid materials into light liquid oils by two steps. Where possible, the same numeral has been used in Figure 2 as has already been indicated in Figure 1. Hydrocarbon oil is withdrawn from any suitable storage not shown, by a line 1 and may be forced to a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8a shown in Figure 1 and similar parts are designated by the same numerals. A heavy liquefied material is withdrawn from the base of the oven 8a and may be continuously discharged into the second oven indicated by 8b. This oven may be packed with a suitable solid catalytic material indicated at 11' and with the exception that no stirring mechanism is used it may be constructed similarly to oven 8a.

Hydrogen is forced under high pressure from the line 12, as before, through a heat exchanger 13 and by the line 14 and branches 14a and 14b through the discharge heads 15a and 15b into oven 8a and 8b respectively. Vaporous products and gas are removed from both ovens by vapour line 16a and 16b respectively which may discharge through a single exchanger 13 to condenser 17. The light oils are separated from the gases in the separator 18 from which the oil is removed by 19 and the gas may be removed, purified and recompressed as indicated in Figure 1. Heavy oil may be continuously withdrawn from the oven 8b and a part or the whole thereof may be continuously discharged through a line 24a, cooler 26 and conducted by line 25 to any suitable storage. If desired, a part of this oil may be re-circulated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25 so as to prevent accumulation within the system. Fresh hydrocarbon oil may be continuously fed in sufficient quantity to carry in the solid material or if desired, a part of the oil withdrawn from the second oven, either containing ash or from which the ash has been removed by filtration, settling centrifugal means or the like may be recirculated for the purpose of bringing in the fresh solid material.

In the following examples the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continuously feeding liquid or difficultly vaporizable oils, the rate of flow may be in the neighborhood of .3 to .8 volumes of oil per hour per volume of reaction space. Vaporous materials may be treated at higher temperatures and the feed rate may consequently be one or even one and one half volumes per hour per volume of reaction space. The volume of hydrogen may likewise vary considerably and should always of course be in excess of that actually required for the conversion; for example, the rate of flow of hydrogen may be in excess of about 600 litres per kilogram of carbonaceous material.

The following examples will serve to further explain how our invention is carried out in practice, but we do not restrict our invention to these examples.

*Example 1*

Steamer fuel oil, produced from American oil, is passed in a continuous manner, together with a mixture of hydrogen and nitrogen, at about 500° C. and under a pressure of 200 atmospheres over a contact mass prepared by impregnating porous material with silver nitrate. The gas is circulated while maintaining the pressure and making up for the consumed hydrogen by fresh gas. A light colored product of 0.85 sp. gr. is produced, the lower fractions of which may directly serve as a fuel for internal combustion engines, while the higher fractions are a high-grade starting material for preparing lubricating oil.

Instead of silver nitrate, cupric hydroxide may be treated in a similar way. Further these compounds may be mixed with each other or with compounds of iron, cobalt and the like.

Example 2

Cresylic acid obtained from coal tar is continuously passed along with a mixture of hydrogen and nitrogen at about 450° C. and under a pressure of about 150 atmospheres over a contact mass containing the oxids of silver and titanium. The phenolic bodies are hereby completely reduced to hydrocarbons. Contact masses comprising lithium carbonate, magnesite, manganese oxid, silver borate, or copper and cerium oxid, or silver and cobalt oxid can be used similarly.

Example 3

Brown coal producer tar is continuously passed together with a current of hydrogen, under a pressure of 800 atmospheres and at a temperature of about 500° C. over a contact mass consisting of porous material coated with vanadic acid. The product obtained consists of up to 50 per cent of petrol.

A catalyst containing thoria or a mixture of compounds of uranium and zinc or of copper and zinc or of silver and tungsten or of silver and silicon or others with or without a carrier may also be used.

In all of the above examples the hot parts of the apparatus may be lined or coated with aluminium or aluminium alloys or chromium or made of or coated with an alloy of 60 per cent of nickel, 27.7 per cent of iron, 12 per cent of chromium and 0.3 per cent of carbon; or an alloy composed of 58 per cent of nickel, 25 per cent of iron, 17 per cent of chromium and 0.03 per cent of carbon; or an alloy composed of 96 per cent of iron, 1.75 per cent of nickel, 1.5 per cent of chromium, 0.1 per cent of carbon and also 0.25 per cent of silicon, 0.27 per cent of manganese, besides small quantities of copper, sulfur and phosphorus.

Our invention is not confined to the above examples; the conditions may be widely varied in various directions. For example the pressures and temperatures may be higher or lower than stated above.

What we claim is:—

1. The process of converting high boiling carbonaceous substances, such as solid and liquid fuels, distillation and extraction products thereof into valuable low boiling liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper.

2. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper.

3. The process of converting high boiling carbonaceous substances, such as solid and liquid fuels, distillation and extraction products thereof into valuable low boiling liquids, by destructive hydrogenation, which comprises treating them with added hydrogen at a pressure of at least 50 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper.

4. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 50 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper.

5. The process of converting high boiling carbonaceous substances, such as solid and liquid fuels, distillation and extraction products thereof into valuable low boiling liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper together with a substance present under the conditions of working as a difficultly reducible oxide.

6. The process of converting high boiling carbonaceous substances, such as solid and liquid fuels, distillation and extraction products thereof into valuable low boiling liquids, by destructive hydrogenation, which comprises treating them with added hydrogen at a pressure of at least 50 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper together with a substance present under the conditions of working as a difficultly reducible oxide.

7. The process of converting high boiling carbonaceous substances, such as solid and liquid fuels, distillation and extraction products thereof into valuable low boiling liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper together with a substance present under the conditions of working as a difficultly reducible oxide and a metal from the eighth group of the periodic system.

8. The process of converting high boiling carbonaceous substances, such as solid and liquid fuels, distillation and extraction products thereof into valuable low boiling liquids, by destructive hydrogenation, which comprises treating them with added hydrogen at a pressure of at least 50 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper together with a substance present under the conditions of working as a difficultly reducible oxide and a metal from the eighth group of the periodic system.

9. The process of converting high boiling carbonaceous substances, such as solid and liquid fuels, distillation and extraction products thereof into valuable low boiling liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper, the initial material and the hydrogen being continuously introduced into the reaction vessel and the reaction products being continuously removed therefrom.

10. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper and removing the reaction products from the reaction vessel in admixture with the stream of escaping hydrogen.

11. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper, removing the reaction products from the reaction vessel in admixture with the stream of escaping hydrogen, separating the reaction product from the hydrogen and returning the hydrogen to the reaction zone.

12. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper, removing the reaction products from the reaction vessel in admixture with the stream of escaping hydrogen, cooling the mixed stream for the condensation of hydrocarbon vapors and separating the condensate from the hydrogen.

13. The process of converting high boiling carbonaceous substances, such as solid and liquid fuels, distillation and extraction products thereof into valuable low boiling liquids, by destructive hydrogenation, which comprises treating them with a stream of added hydrogen at a pressure of at least 20 atmospheres and at a temperature of between 300° and 700° C. at which they will undergo conversion to a substantial extent into low boiling hydrocarbons of gasoline character in the presence of a catalyst comprising at least one of the substances in the solid state selected from the group consisting of compounds of silver and copper, removing the reaction products from the reaction vessel in admixture with the stream of escaping hydrogen, cooling the mixed stream for the condensation of hydrocarbon vapors, removing the uncondensed hydrocarbon vapors at least in part from the hydrogen and recycling the latter.

14. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst comprising at least one of the substances in the solid state selected from the group consisting of oxygen-containing compounds of silver and copper.

15. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst comprising at least one of the substances in the solid state selected from the group consisting of oxides of silver and copper.

16. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst comprising at least one of the substances in the solid state selected from the group consisting of nitrates of silver and copper.

17. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst comprising copper hydroxide.

18. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst immune to poisoning by sulphur comprising at least one of the substances in the solid state selected from the group consisting of compounds of silver and copper.

19. The process of converting high boiling carbonaceous substances, such as solid and liquid fuels, distillation and extraction products thereof into valuable liquids, by destructive hydrogenation, which comprises treating them with added hydrogen at a pressure of at least 20 atmospheres and at a temperature of between 300° and 700° C. at which they will undergo conversion to a substantial extent into low boiling hydrocarbons of gasoline character, in the presence of a catalyst comprising at least one of the substances in the solid state selected from the group consisting of compounds of silver and copper together with a difficulty reducible oxide of a metal selected from the class consisting of magnesium, lithium, zinc, manganese or vanadium.

In testimony whereof we have hereunto set our hands.

CARL KRAUCH.
MATHIAS PIER.